United States Patent [19]

Morse

[11] 4,110,151

[45] Aug. 29, 1978

[54] APPARATUS FOR THE PREPARATION OF RESIN IMPREGNATED GLASS FIBER SHEETS

[75] Inventor: Donald B. Morse, Joliet, Ill.

[73] Assignee: Kemlite Corporation, Joliet, Ill.

[21] Appl. No.: 532,206

[22] Filed: Dec. 12, 1974

Related U.S. Application Data

[62] Division of Ser. No. 259,846, Jun. 5, 1972, Pat. No. 3,888,716.

[51] Int. Cl.² ............................................. B32B 31/12
[52] U.S. Cl. .................................... 156/519; 156/538; 156/555
[58] Field of Search .................... 156/62.2, 62.4, 62.6, 156/62.8, 276, 279, 433, 436, 538, 543, 555

[56] References Cited

U.S. PATENT DOCUMENTS

| 2,771,387 | 12/1956 | Kleist et al. | 156/62.2 |
| 3,137,601 | 6/1964 | Menzer | 156/276 |
| 3,163,689 | 12/1964 | Ives | 156/436 |
| 3,560,294 | 2/1971 | Potkanowicz | 156/276 |

*Primary Examiner*—Caleb Weston
*Attorney, Agent, or Firm*—Carl C. Batz

[57] ABSTRACT

The preparation of a resin impregnated glass fiber sheet wherein a layer of thermosetting resin is deposited on a cover film, a layer of glass fibers formed over the resin layer, and the film carrying the resin and glass fiber layer passed downwardly between a pair of spaced rolls while controlling the rate at which the resin is deposited in accordance with the speed at which the glass fiber layer is passed between said rolls, to maintain a pool of resin between the rolls as the apparatus continues to operate.

5 Claims, 4 Drawing Figures

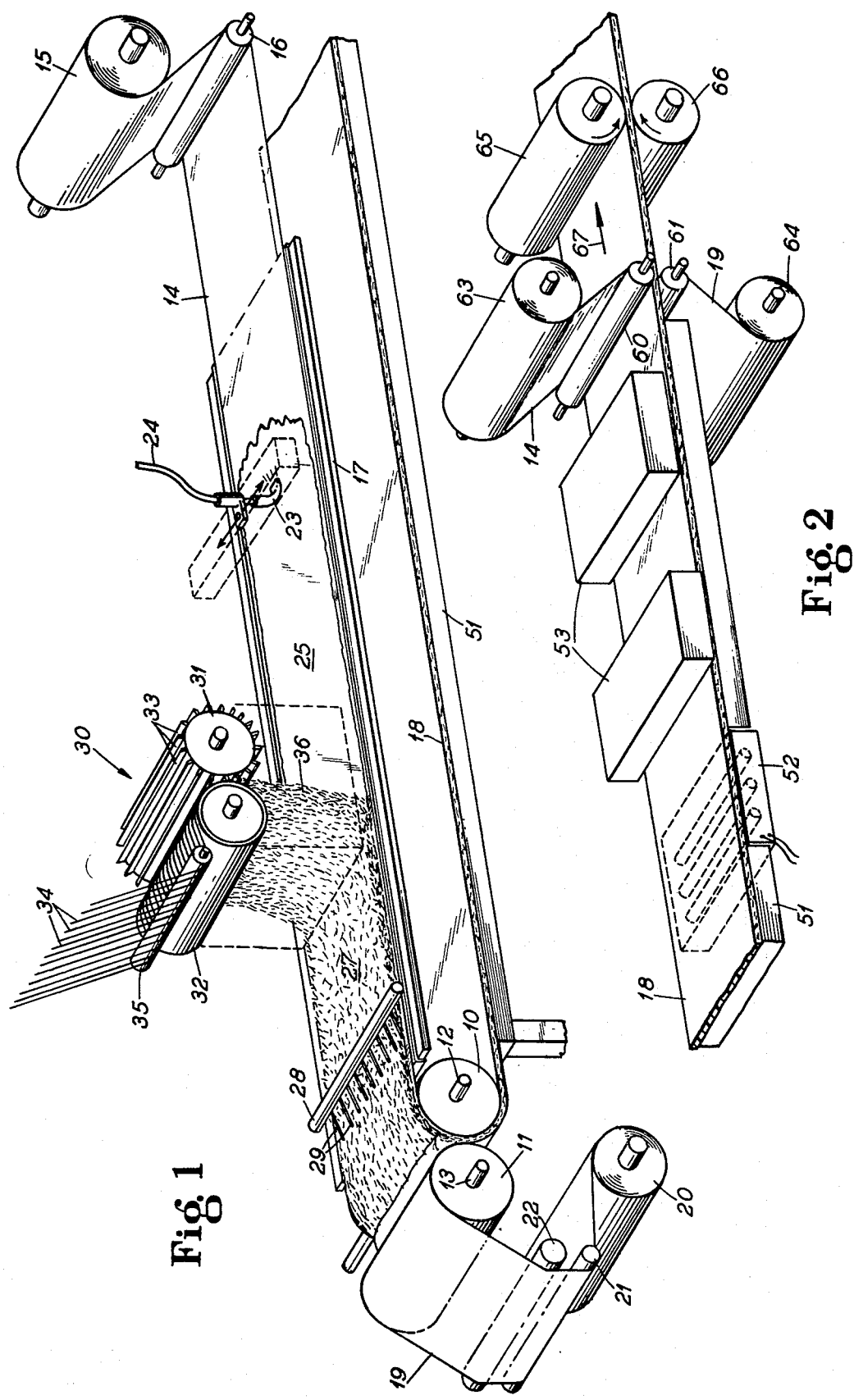

APPARATUS FOR THE PREPARATION OF RESIN IMPREGNATED GLASS FIBER SHEETS

This is a division of application Ser. No. 259,846 filed June 5, 1972 U.S. Pat. No. 3,888,716.

This invention relates to methods and apparatus for the preparation of resin impregnated glass fiber sheets and particularly to methods and apparatus for the manufacture of thermosetting resin sheets in which glass fibers are utilized as reinforcing structure.

BACKGROUND

Resin sheets having glass fiber reinforcements are well known in the construction trades and such sheets are used particularly as liners in refrigerator compartments and in the transportation industry have been used as liners for railway cars and trucks.

Such sheets have been made by passing a glass fiber mat through a bath of thermosetting resin, encasing the glass fiber mat with resin contained therein between top and bottom films and passing this structure between spaced rolls to squeeze out surplus resin and to gauge the thickness of the resulting sheet, after which the sheet is heated to set the resin. One such manufacture is set forth in Menzer U.S. Pat. No. 2,980,574; another is set forth in my U.S. Pat. No. 3,480,497 and still another is set forth in Menzer U.S. Pat. No. 3,137,601. Another is set forth in the Finger U.S. Pat. No. 2,969,301.

Several difficulties have been encountered when practicing the prior methods. When a resin layer is laid down and a glass fiber layer put on top of it, and this combination placed between films and passed between rollers, the glass fibers next to the resin layer may get properly impregnated but the fibers on the other side of the glass layer are very likely not to be properly impregnated or may be irregularly impregnated, resulting in a poor quality product.

While it is possible to use a pre-formed mat of glass fibers and run the mat of fibers through a resin bath, the pre-forming of the mat adds to the cost of the product and in addition the dipped glass mat is sticky and cannot be easily handled by machinery.

The Menzer U.S. Pat. No. 3,137,601 (which is assigned to the same assignee as the present application) introduces the outer films in such a way as to form a V shaped pocket between them, and roving cutters sprinkle glass fibers onto the surface of the resin pool contained in this pocket. But a difficulty of this system is that the glass fibers tend to stay in a layer on the surface of the pool and it is difficult to get them to descend into the lower part of the pool in any kind of distributed fashion. This may be due to the fibers becoming interconnected at the surface or for some other reason, but in any event the difficulty persists.

I have discovered that by laying the thermosetting resin down on one of the cover films and placing a glass fiber layer over the resin and then passing this composite downwardly through a pool of resin and between the spaced rolls, it is possible to control the amount of resin with respect to the rate at which the glass fiber layer is passed between said rolls so that the pool is maintained, and in this way a sandwich structure can be prepared which, when subjected to heat, forms a reinforced sheet of the finest quality.

DRAWINGS

One embodiment of the invention is illustrated by the accompanying drawing in which:

FIG. 1 is a perspective view of apparatus for the manufacture of the resin impregnated glass fiber sheets;

FIG. 2 is a perspective view of an extension of the apparatus shown in FIG. 1;

DETAILED DESCRIPTION

Figure 3:
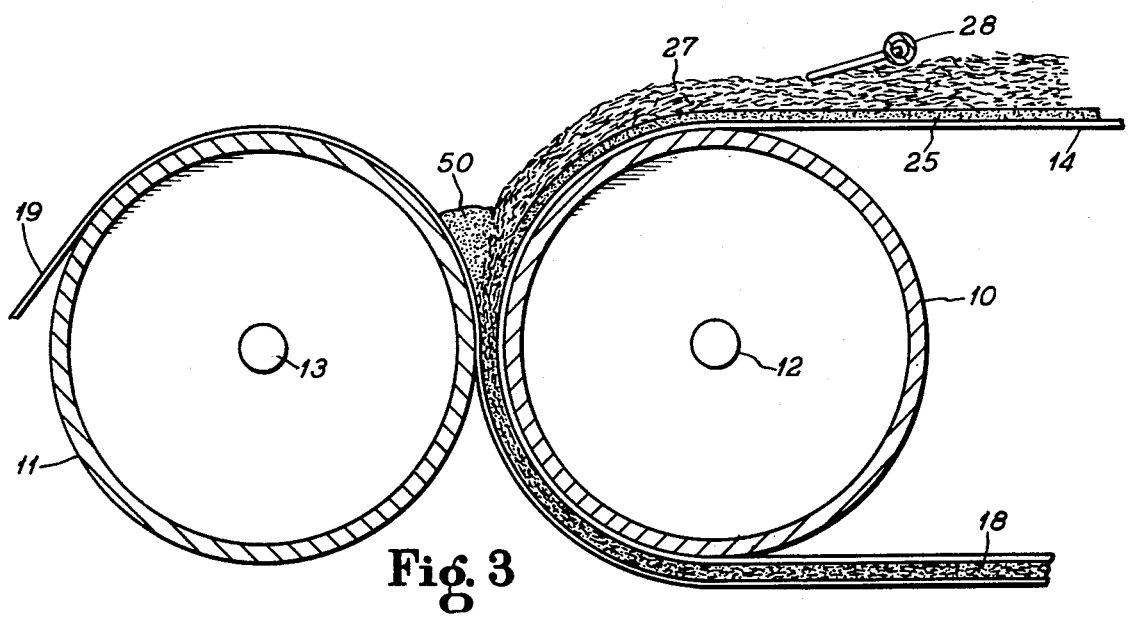
FIG. 3 is an enlarged sectional view showing the spaced rolls and the material as it passes between them.

As illustrated, the apparatus includes a pair of spaced rolls 10 and 11. These rolls have uniform cylindrical surfaces and are carried on shafts 12 and 13 respectively. These shafts are parallel and in a horizontal plane. They rotate in opposite angular directions; that is, roll 10 rotates clockwise (as seen in FIG. 1) and roll 11 rotates counter-clockwise. Any material which passes between these rolls thus passes downwardly and through the narrowed space between the rolls at the plane of their shafts. These rolls should be mounted in the frame structure of the apparatus in a manner known to the art so that the shafts may be moved closer together or farther apart so as to alter and adjust the spacing between them to allow for the manufacture of sheets of different thicknesses.

A pair of flexible cover films is utilized in the manufacture and these may be thin sheets of regenerated cellulose such as that commonly sold under the trademark Cellophane. One of these sheets 14 comes from the roll 15. Film from roll 15 passes under the guide roll 16 over the top of table 17 and onto the top of roll 10, passing around and in contact with roll 10 from the top to the bottom of this roll, and then returning back in a direction opposite to the direction in which it approached roll 10, forming the top layer in the sandwich structure 18 then formed.

The other flexible cover film 19 comes from the roll 20, passes around roll 21, slides over the arcuate surface 22, then onto roll 11, then about roll 11 and downwardly between rolls 10 and 11, and after it reaches the center of rolls 10 and 11 turning about roll 10 to form the bottom of the bottom layer in the sandwich structure 18 then formed.

The table 17 has a uniform planar surface which is horizontal and level so that liquid will flow evenly across the surface. Preferably, this table should be of metal or other heat conducting material so that the temperature of the liquid resin which is to be deposited on the film will not be caused to vary in viscosity.

As the film 14 moves on top of table 17 liquid resin is deposited onto the surface of the film 14 by a nozzle 23 which is supplied through the line 24. The resin is deposited on the top side of film 14 as it is deposited, but as will later be apparent this becomes the under side of the top film when the sandwich sheet is formed. Nozzle 23 is mounted to oscillate in a lateral direction transversely across the film. A mound of liquid resin is thus discharged onto the film which flows out to a uniform layer 25. Suitably the viscosity of the liquid resin is controlled so that it will stop spreading out before it spills over the side edges of the film.

The resin which I employ is a thermosetting resin which may be a polyester, for example, or a mixture of polyester and styrene, and may contain a predetermined portion of catalysts, fillers and pigments.

As the resin coated film moves along on table 17 it comes under the cutter device 30. This device includes a pair of rolls 31 and 32, roll 31 being equipped with knives 33. Strands of glass fibers 34 are fed around roll 35 and between rolls 31 and 32 so that as the rolls 31 and 32 rotate toward each other the knives cut the strands into relatively short lengths, such as from one to three inches. The chopped fibers 36 fall down onto the resin layer 25 and stick there. A shroud (shown in dotted lines in FIG. 1) may be provided to confine the chopped fibers and prevent their scattering about the room.

As the chopped fibers fall onto the resin layer the first fibers which strike the resin stick to the resin and the fibers continue to build up on each other to form a glass layer 27 on top of the resin layer with the glass fibers more or less inter-tangled.

I provide a bar 28 which extends above and transversely of the glass layer 27. This bar has the spaced fingers 29 the ends of which ride on the top of the glass layer 27 and tend to distribute and tuck in the uppermost fibers to even the top surface of the glass layer 27.

Refering now to FIG. 3, where I have attempted to illustrate what takes place between the rolls 10 and 11, the thickness of the films and of the resin and glass layers are here shown exaggerated with respect to the size of the rolls. As the cover films and the glass and resin layers pass downwardly between the rolls they pass through the narrowest part of the passage which is at the plane of the axes of the rolls, and which is sometimes called the nip of the rolls. The spacing between the rolls at the nip determines the thickness of the sandwich structure which is formed.

As shown particularly in FIG. 3, I provide a pool of resin 50 which is contained in the pocket formed by the films 14 and 19 and is disposed between rolls 10 and 11 just above the nip of these rolls. This pool is fed by the layer of resin 25 which is introduced on top of the film 14. As the combined material passes downwardly to the nip of the rolls, resin is being passed into and through the glass layer 27 from both sides — from the resin layer 25 on the one side, and from the pool 50 on the other side, so as to provide very thorough and even impregnation of the glass layer with resin. Also, as the composite layers move into the nip of the rolls these layers come under compression and the resin layer, as such, disappears and at the nip of the rolls the thickness ol the resin impregnated glass sheet may be only a fraction of the thickness of the resin and glass layers at the top of roll 10.

If desired, end pieces may be provided to confine the resin pool at the ends of the rolls, but I find this is not necessary if the viscosity of the resin is properly controlled. The pool 50 as it is maintained may be of substanitally uniform maximum depth at the central portion of the sheet and may taper down to a zero depth at the extreme ends of the rolls.

In introducing the film 19 to the roller 11 I find that a wrinkling problem is avoided if the film is passed over the arcuate surface 22 before passing onto the roll 11. While it might be expected that the film would be best introduced to the roll 11 by passing it over a roller, I find that by sliding the film over the stationary arcuate surface there is a smoothing effect which avoids wrinkles that would otherwise occur if a rotating roller is employed.

As the sandwich sheet 18 issues from the nip of rolls 10 and 11 it turns about roll 10 and passes off at the bottom of this roll in a plane parallel with and spaced from the film 14 which is moving towards the rolls. As it passes from rolls 10 and 11 the sandwich 18 is moving in a direction opposite the direction in which the film 14 is passed toward these rolls. Support for the sandwich sheet is provided by the table 51 the top surface of which is in a plane parallel with and spaced from the plane of table 17.

An extension of the sandwich sheet and table 51 is shown in FIG. 2. Associated with table 51 is a lamp 52 arranged to direct light upwardly through the sandwich sheet 18. The cover films 14 and 19 and the resin impregnated glass layer between them are each either transparent or translucent to light, and by viewing the sheet from the top as it passes over the lamp 52 any irregularities in the structure of the sheet may be detected, and suitable adjustment made in the process factors to correct such irregularities.

As the sandwich sheet 18 passes farther on table 51 it comes under the heaters 53 which may be electric or gas fired or otherwise heated, so that the temperature of the resin contained in the sandwich sheet is raised to the setting temperature of the resin. Thus heated, the sheet becomes cured and relatively rigid.

As the sandwich sheet moves onwardly from table 51 it passes between rolls 60 and 61 from which the top film 14 is removed separately and wound on roll 63, and the bottom film is removed separately and wound on roll 64. The resin impregnated fiberglass sheet free of the top and bottom sheets moves then between the rolls 65 and 66, which rolls by their frictional contact with the then rigid glass-resin sheet drive this sheet in the direction of arrow 67.

The pull which is given to the sheet by rolls 65 and 66 is effective to draw the films and the glass and resin layers through the machine, there being no drive power applied to either of rolls 10 and 11 or to the top film rolls 16 and 17 or to the lower film rolls 20 and 21. This feature of moving the films and the resin and glass layers through the process by application of a pulling force on the cured product results in a minimum of wrinkling or other faults in the product. It should be understood, of course, that the rate at which rolls 65 and 66 are driven is determinative of the rate at which the materials are being passed downwardly between the rolls 10 and 11 and that by driving rolls 65 and 66 at a controlled speed as to control the rate of the passage of the film 14 and the resin impregnated glass fiber layers between the rolls 10 and 11.

Figure 4:
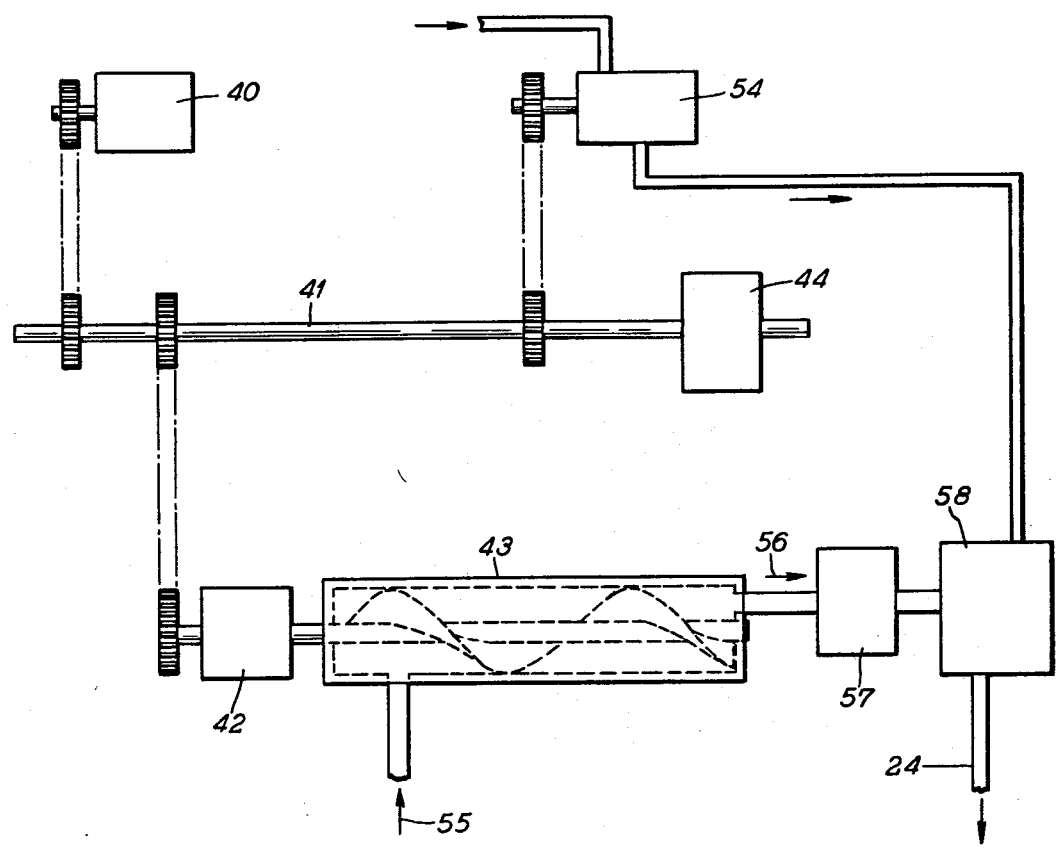
FIG. 4 is a schematic view of the drive, gearing and pumping mechanisms.

Control of the rate at which the resin deposited on film 14 may be obtained by the use of the system illustrated in FIG. 4. It may be explained that the rate at which resin is deposited depends first on the setting of the space between rolls 10 and 11, and secondly on the rate at which the rolls 10 and 11 are driven. The setting of the spacing between rolls 10 and 11 is determined in accordance with the thickness of the sheet desired, and this factor then remains unchanged throughout the process.

It was to me surprising that it is possible to control the rate of flow of the resin being supplied over the film 14 so that the pool 50 could be continuously maintained. This may be accomplished by utilizing the system illustrated in FIG. 4.

As illustrated, the motor 40 drives the shaft 41 and through gearing 42 drives the pump 43. Shaft 41 also, through gearing 44, drives rolls 65 and 66. Shaft 41 also drives rolls 31 and 32 of the chopper device 30, and the rate at which these rolls 31 and 32 are driven determines the rate at which the chopped fibers are deposited on film 14.

The resin may be, for example, a polyester resin containing a styrene monomer and a methylmethacrylate monomer in the proportion of about 3:1:1 respectively, and the catalyst may be, for example, methyl ethyl ketone peroxide or other liquid peroxide in the amount of about 1 to 2 percent by weight of the polyester resin.

I prefer to use a positive displacement, progressive cavity, resin pump, as shown. The resin enters this pump as indicated by arrow 55 and upon activation of the pump is forced out of the pump in the direction of arrow 56 into the heater 57 which raises the temperature of the resin to a predetermined degree, suitably between 70° and 100° F. and into a mixer 58. Rotation of pump 54 delivers catalyst in proportion to the rate of delivery of the resin, and the resin with the catalyst mixed therein, is delivered from the mixer 58 to the tube 24 (FIG. 1) and as previously described the resin so delivered is distributed onto the sheet 14.

It is understood that once this system is balanced to provide for the pool 50 having a predetermined depth for a particular spacing of rollers 10 and 11, the system will operate to maintain the pool, and the sheet product will be prepared in a uniform continuous manner. Any variation in the speed of the motor 40 to increase or decrease the speed at which the rolls 65 and 66, and 31 and 32, are rotated will be automatically compensated by a corresponding increase or decrease of the rate at which the resin (containing the correct proportion of catalyst) is delivered to the film 14 as it passes on the top of table 17, and also a corresponding increase or decrease of the rate at which glass fibers are deposited on the resin layer.

While only one embodiment of my invention has been illustrated in the drawings and described in the foregoing detailed description, it is understood that the invention may take many forms and is subject to wide variation all within the spirit of the invention.

What I claim is:

1. Apparatus for preparing a resin impregnated glass fiber sheet comprising a pair of spaced rolls, having a nip therebetween, a cover film extending over one of said rolls and into the nip of said rolls, a second cover film extending over the other of said rolls and into the nip of said rolls, one of said films having thereon a layer of thermosetting resin, means for depositing resin on said one film, said means including a pump, and power means for driving said pump and said rolls at synchronized speeds whereby said pump is caused to deliver sufficient resins to fill the nip between said films and to form a pool therebetween above the nip of said rolls so as to maintain said pool as the operation proceeds, means for cutting glass fiber strands into individual fibers and for distributing the cut fibers at a location above said resin layer to cause the cut fibers to fall and form a layer of glass fibers on said resin layer, said films forming between said rolls a pocket, and a pool of resin in said pocket whereby upon rotation of said rolls toward each other said pool is fed by said resin layer and resin from said pool is pressed in the nip of said rolls into said glass fiber layer.

2. Apparatus as set forth in claim 1 wherein said pump is of the positive displacement type having a screw impeller, whereby the resin being delivered is closely controlled with respect to the speed at which said rolls are rotated.

3. Apparatus for preparing a resin impregnated glass fiber sheet comprising a pair of spaced rolls having a nip therebetween, a cover film extending over one of said rolls and into the nip of said rolls, a second cover film extending over the other of said rolls and into the nip of said rolls, one of said films having thereon a layer of thermosetting resin, means for cutting glass fiber strands into individual fibers and for distributing the cut fibers at a location above said resin layer to cause the cut fibers to fall and form a layer of glass fibers on said resin layer, said films forming between said rolls a pocket, a pool of resin in said pocket whereby upon rotation of said rolls toward each other said pool is fed by said resin layer and resin from said pool is pressed in the nip of said rolls into said glass fiber layer, a rigid table having a uniform planar surface over which said one film may be passed to said one roll, means for distributing liquid resin onto said one film over said table, a second table beneath and parallel to said first mentioned table over which said resin and fibers may be passed after they have issued from the nip of said rolls, and a lamp associated with said second table, said lamp being positioned to direct light through the resin and fiber sheet as it passes over said second table, whereby the top surface of said sheet may be inspected to discover irregularities in the structure of the sheet as the sheet passes over said second table.

4. Apparatus for preparing a resin impregnated glass fiber sheet comprising a pair of spaced rolls having a nip therebetween, a cover film extending over one of said rolls and into the nip of said rolls, a second cover film extending over the other of said rolls and into the nip of said rolls, one of said films having thereon a layer of thermosetting resin, means for cutting glass fiber strands into individual fibers and for distributing the cut fibers at a location above said resin layer to cause the cut fibers to fall and form a layer of glass fibers on said resin layer, said films forming between said rolls a pocket, a pool of resin in said pocket whereby upon rotation of said rolls toward each other said pool is fed by said resin layer and resin from said pool is pressed in the nip of said rolls into said glass fiber layer, and a stationary guide having an arcuate surface over which said second cover film may be passed to smooth the same prior to its passage onto said other roll.

5. Apparatus for preparing a resin impregnated glass fiber sheet comprising a pair of spaced rolls having a nip therebetween, a cover film extending over one of said rolls and into the nip of said rolls, a second cover film extending over the other of said rolls and into the nip of said rolls, one of said films having thereon a layer of thermosetting resin, means for cutting glass fiber strands into individual fibers and for distributing the cut fibers at a location above said resin layer to cause the cut fibers to fall and form a layer of glass fibers on said resin layer, said films forming between said rolls a pocket, a pool of resin in said pocket whereby upon rotation of said rolls toward each other said pool is fed by said resin layer and resin from said pool is pressed in the nip of said rolls into said glass fiber layer, and a structure extending above said glass fiber layer and containing spaced fingers thereon, said fingers having ends arranged to ride upon said glass fiber layer as said rolls are rotated whereby to tuck in the uppermost fibers and even the top surface of the glass fiber layer.

* * * * *